United States Patent [19]
Johnston et al.

[11] Patent Number: 5,046,786
[45] Date of Patent: Sep. 10, 1991

[54] COMBINATION BRAKE VALVE MODULE

[75] Inventors: Jeffery S. Johnston, Haslett; Michael G. Smith, Owosso; Mark Karpinski, Rochester Hills, all of Mich.

[73] Assignee: Midland Brake, Inc., Kansas City, Mo.

[21] Appl. No.: 537,083

[22] Filed: Jun. 12, 1990

[51] Int. Cl.$^5$ ............................................. B60T 13/00
[52] U.S. Cl. ................................... 303/7; 188/151 A; 303/9.66; 303/28; 303/40; 303/DIG. 3; 303/13; 303/69
[58] Field of Search ......................... 303/7, 9, 13, 9.61, 303/9.66, 9.63, 9.75, DIG. 3, 68, 69, 40, 28-30; 188/151 A, 1.11, 3 R, 3 K

[56] References Cited

U.S. PATENT DOCUMENTS

| | | |
|---|---|---|
| 3,420,256 | 1/1969 | Kobnick . |
| 4,348,062 | 9/1982 | Koenig . |
| 4,410,218 | 10/1983 | Bueler . |
| 4,455,051 | 6/1984 | Falk . |
| 4,571,007 | 2/1986 | Carmichael et al. . |
| 4,596,265 | 6/1986 | Goodell ........................ 303/69 X |
| 4,725,101 | 2/1988 | Szudy et al. ................... 303/9.66 |
| 4,775,192 | 10/1988 | Pohl et al. ........................... 303/7 |

OTHER PUBLICATIONS

Beier et al., MVMA/TTMA Brake Committee, Truck/Trailer Brake Compatibility, (undated).

Primary Examiner—Douglas C. Butler
Attorney, Agent, or Firm—Neuman, Williams, Anderson & Olson

[57] ABSTRACT

A pressurized fluid control module is provided for a tractor-trailer brake system to effect the appropriate braking function. The pressurized fluid control module is combined with pressure inlet fittings for the introduction of a pressurized fluid, a plurality of interconnected pressure chambers for selectively actuating the vehicle service and parking brake circuits, a proportioning circuit to vary the fluid pressure to the rear service brakes depending on the presence or absence of the trailer, a protection circuit to prevent the loss of pressurized fluid within the pneumatic brake actuation and release circuit upon detachment of the trailer from the tractor, quick release valves to release residual fluid pressure in the pressurized fluid control module and the trailer service brake circuit upon the cessation of braking effort, module check valves to prevent fluid pressure losses between the chambers, a vehicle rear stop lamp switch sensitive to the fluid pressure in one of the pressure chambers, and a plurality of outlet fittings to the aforementioned service and parking brake circuits. The pressurized fluid control module of the present invention, as a single, integrated, multifunctional unit, obtains control over the tractor rear service brake circuit and parking brake circuit and the trailer service and parking brake circuit depending on the presence of the trailer, the braking effort exerted by the vehicle operator via the foot-actuated treadle assembly service brake valve assembly, the position of the hand-actuated trailer service brake valve, and the position of the manifold push/pull valve.

9 Claims, 9 Drawing Sheets

COMBINATION BRAKE VALVE MODULE

BACKGROUND OF THE INVENTION

1. Field of the Invention

This invention relates to a combination brake valve module for use in a tractor-trailer combination, including semi-trailer configurations. Specifically, this invention discloses a multi-functional, compact, integrated brake valve module for use in fluid pressure brake systems incorporating a proportioning apparatus for modulating the braking effort to the tractor single or tandem rear service brake circuits, a tractor fluid pressure protection system in the event of trailer separation from the tractor, quick-release pressure orifices for venting residual fluid pressure from the combination brake valve module and trailer service brake circuit, integrated check valves for insuring fluid pressure integrity through the combination brake valve module, and stop lamp switching control for activation of the tractor-trailer combination rear stop lamp units. The module may optionally be provided with fluid pressure relay valves for control of the tractor or tractor-trailer combination service brake circuits.

2. Description of the Prior Art

In the past, brake systems for tractor-trailer combinations, such as semi-trailer configurations, have adopted braking systems that utilize a pressurized fluid for control of the service and parking brakes. The pressurized fluid, generated by a compressor provided on the tractor unit and typically driven by the vehicle engine, is usually ported to two independent pressurized fluid reservoirs. Through a series of actuation valves, a pressure signal is provided to various relay valves arranged in the brake pressurized fluid system to port the pressurized fluid from the fluid reservoirs to the appropriate brake application device, such as a diaphragm-type service brake cylinder.

Recently, an addition to the service brake circuit has been a proportioning apparatus for modulating the braking effort to the tractor single or tandem rear service brake circuits. Further, an integrated and independent pressurized fluid circuit is provided to deliver pressurized fluid from the fluid reservoirs to hold-off spring-type parking brake actuators allowing vehicle movement. Thus, to achieve the proper performance of the aforementioned generalized braking system, the prior art systems required a multiplicity of non-integrated components which were characterized by complexity, substantial space requirements, higher component costs, greater installation and maintenance charges and associated problems.

The multi-functional, compact, integrated brake valve module of the present invention lends itself to the same function of braking systems as employed in the prior art and accomplishes substantially the same functions with enhanced performance. As will be apparent from the description herein, the brake valve module of the present invention also results in less complexity, fewer components and attendant packaging simplification. Further, the brake valve module of the present invention replaces original equipment manufactured (OEM) tractor protection valves in existing vehicles to add additional features and functions (i.e., proportioning apparatus for modulating the braking effort to the tractor single or tandem rear service brake circuits) that could not heretofore be economically and advantageously introduced into the brake pressurized fluid circuit. This simplification provides the potential for enhanced reliability, reduced investment, and lower installation and maintenance costs.

In general, the functions which the combination brake valve module of the present invention carries out include the following:

(a) It provides proportioning apparatus for modulating the braking effort to the tractor single or tandem rear service brake circuits.

(b) It provides tractor fluid pressure protection in the event of trailer separation from the tractor.

(c) It provides quick-release pressure orifices for venting residual fluid pressure in the combination brake valve module and trailer service brake circuit.

(d) It provides integrated check valves for insuring fluid pressure integrity through the combination brake valve module.

(e) It provides convenient stop lamp switching control for activation of the tractor-trailer combination rear stop lamp units.

Additionally, as an optional configuration, the combination brake valve module of the present invention can be arranged to provide fluid pressure relay valves for control of the tractor or tractor-trailer combination service brake circuits.

Accordingly, it is an objective of this invention to provide an integrated, pressurized fluid control module performing a multiplicity of functions for control of the service and parking brake circuits of a tractor rear brakes and trailer brakes.

It is a further object of this invention to provide a pressurized fluid control module which incorporates a rear tractor service brake proportioning apparatus, a tractor protection system, a quick release pressure orifice, integrated check valves and a stop lamp switch.

It is an additional objective of this invention to provide an integrated pressurized fluid control module that is small, compact, easily packaged and more reliable than currently used system components.

It is still another object of this invention to provide additional capability of the pressurized fluid control module by adding the rear tractor service brake relay valve to the integrated unit.

SUMMARY OF THE INVENTION

The present invention comprises a pressurized fluid control module for use in a tractor-trailer pneumatic brake actuation and release circuit, wherein the application and release of pressurized fluid to and from the vehicle service and parking brake circuits is accomplished by fluid pressure reservoirs, a foot-actuated treadle assembly service brake valve, a hand-actuated trailer service brake valve, a manifold push/pull valve and the aforementioned pressurized fluid control module.

The pressurized fluid control module itself comprises pressure inlet fittings for the introduction of pressurized fluid, a plurality of interconnected pressure chambers for selectively actuating the vehicle service and parking brake circuits, a proportioning circuit to vary the fluid pressure to the tractor rear service brakes depending on the presence or absence of the trailer, a protection circuit to prevent the loss of pressurized fluid within the pneumatic brake actuation and release circuit upon detachment of the trailer from the tractor, quick release valves to release residual fluid pressure in the pressurized fluid control module upon the cessation of braking effort, module check valves to prevent fluid pressure losses between the chambers, a vehicle rear stop lamp switch sensitive to the fluid pressure in one of the pressure chambers, and a plurality of outlet fittings to the aforementioned service and parking brake circuits.

The pressurized fluid control module of the present invention is a single, integrated, multifunctional unit that controls the passage of the pressurized fluid. Thus, control can be obtained over the tractor rear service brake circuit and parking brake circuit and the trailer service and parking brake circuit depending on the presence of the trailer, the braking effort exerted by the vehicle operator via the foot-actuated treadle assembly service brake valve, the position of the hand-actuated trailer service brake valve, and the position of the manifold push/pull valve.

Figure 1:
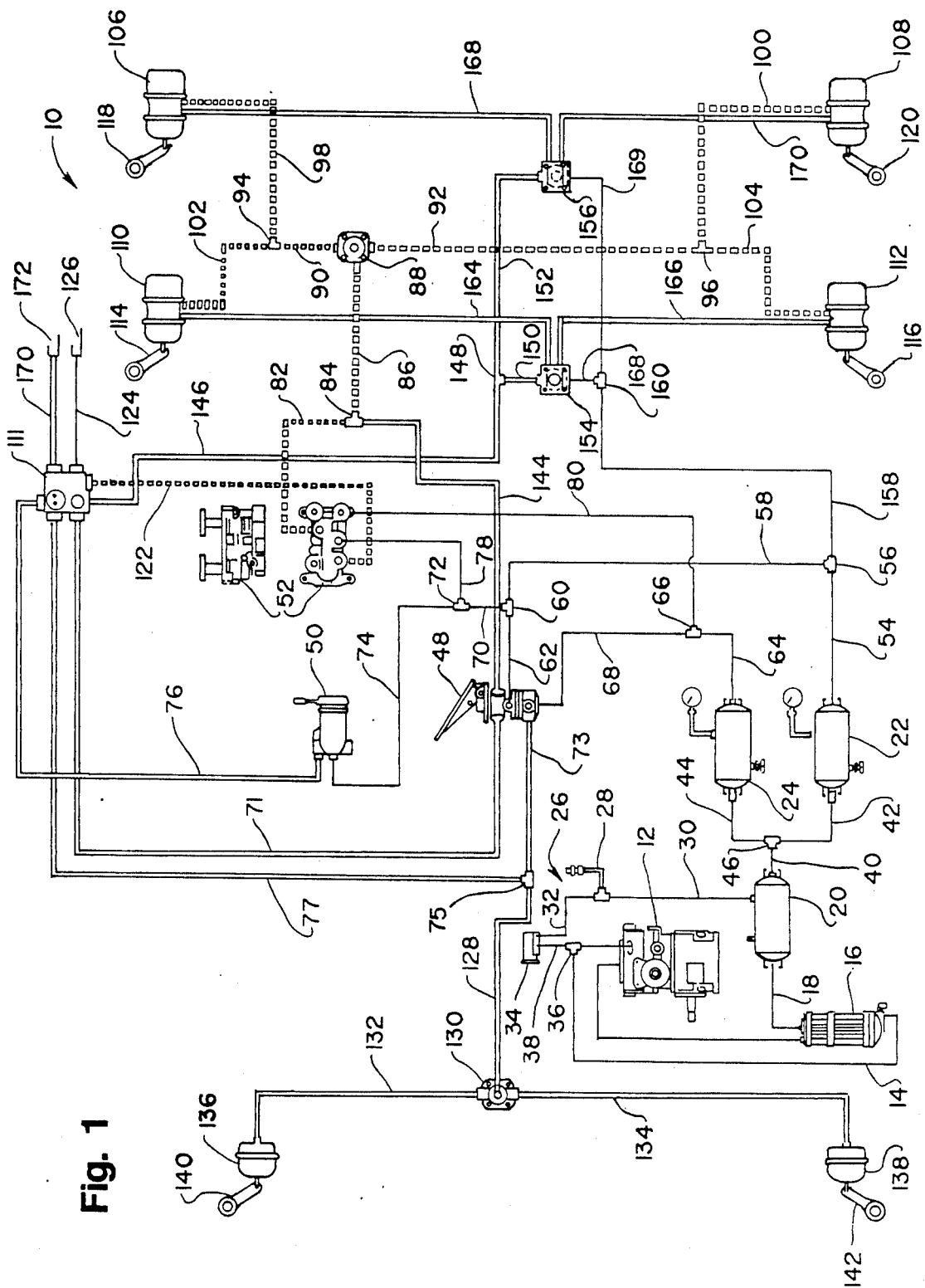
FIG. 1 is an overall schematic of a tractor brake system wherein a pressurized fluid control module according to the present invention is advantageously employed.

It should be understood that the drawings are not necessarily to exact scale and that certain aspects of the embodiments are illustrated by graphic symbols, schematic representations and fragmentary views. It should also be understood that when referring to physical relationships of components by terms such as "upper", "lower", "upward", "downward", "vertical", "horizontal", "left", "right" or the like, such terms have reference solely to the orientation depicted in the drawings, Actual embodiments or installations thereof may differ. It should also be understood that the term "passageway" is not necessarily limited to a tubular path but may encompass communicating spaces, chambers and the like.

While much mechanical detail, including other plan and section views of the particular embodiment depicting have been omitted, such detail is not per se part of the present invention and is considered well within the comprehension of those skilled in the brake arts in the light of the present disclosure. The resulting simplified presentation is believed to be more readable and informative and readily understandable by those skilled in the art. It should also be understood, of course, that the invention is not limited to the particular embodiment illustrated.

DETAILED DESCRIPTION OF THE PREFERRED EMBODIMENTS

Referring to the drawings, wherein like reference characters designate like or corresponding parts throughout the views, FIG. 1 illustrates the overall tractor brake system 10 employing the pressurized fluid control module 111 according to the present invention. Compressed air, typically at about 125 psig, is provided to the system 10 by a compressor 12 driven by the vehicle's engine (not shown) in the well known manner. The compressed air is then directed, via line 14, to dryer 16, where excessive moisture is removed from the compressed air. Line 18 then directs the compressed air to wet tank 20 for holding. Lines 44, 42, branching off through a "tee" fitting 46 from a wet tank outlet line 40, which further directs the compressed air to a primary reservoir 22 and secondary reservoir 24.

A feedback circuit 26 is provided to insure the proper pressurization of the compressed air, and includes a low pressure switch 28, an air pressure governor 34, a line 30 from wet tank 20 to the low pressure switch 28 for signalling the vehicle operator and the air pressure governor 34 of excessively low air pressure, and a line 32 from the low pressure switch 28 to the air pressure governor 34. The feedback circuit 26 is also in fluid communication with the output of the compressor 12 via a line 38 from the air pressure governor 34 and a "tee" fitting 36 connecting the line 38 with the line 14.

As will further be described in detail, the compressed air from primary reservoir 22 and secondary reservoir 24 is controlled by foot-actuated treadle service brake assembly 48, hand control 50 or manifold push/pull dash valve 52.

Foot-actuated treadle service brake assembly 48 is supplied by compressed air from both the primary reservoir 22 and secondary reservoir 24. The primary reservoir is in fluid communication with a first fluid circuit of foot-actuated treadle service brake assembly 48 via outlet line 54, "tee" fitting 56, line 58, "tee" fitting 60, and inlet line 62. The secondary reservoir 24 is in fluid communication with a second fluid circuit of foot-actuated treadle service brake assembly 48 via outlet line 64, "tee" fitting 66, and line 68.

The first fluid circuit of foot-actuated treadle service brake assembly 48 meters air pressure to the service brakes of the trailer via a line 71 and pressurized fluid control module 111, as will be further described. The second fluid circuit of foot-actuated treadle service brake assembly, which is constructed to become operative only after the first fluid circuit of foot-actuated treadle service brake assembly 48 is already operative, directly meters air pressure to the front service brake circuit of the vehicle tractor. The second fluid circuit also provides further metered air pressure to pressurized fluid control module 111 for actuation of the rear service brakes of the vehicle tractor and the service brakes of the trailer, as will also be further described, via line 73, "tee" fitting 75 and a line 77.

Hand control 50 is in fluid communication with the primary reservoir 22 via output line 54, "tee" fitting 56, line 58, "tee" fitting 60, line 70, "tee" fitting 72, and line 74. Hand control 50 is a well known variable orifice valve assembly which allows the vehicle operator to meter air pressure, through line 76 and the pressurized fluid module 111, to only the service brake circuit of the trailer.

Manifold push/pull dash valve 52 also has a first circuit and a second circuit. The first circuit of the dash valve 52 releases the trailer parking brake circuit (not shown). The tractor portion of this circuit includes a line 122 from dash valve 52 to the pressurized fluid control valve 111. As will be further described, the pressurized fluid control valve 111 transfers the system air pressure from dash valve 52 and a line 122 to trailer parking brake gladhand connector 126 via a line 124. The trailer service brake circuit is coupled to the pressurized fluid control module 111 via a line 170 and trailer service brake gladhand connector 172. The first circuit of dash valve 52 is in fluid communication with primary reservoir 22 via outlet line 54, "tee" fitting 56, line 58, "tee" fitting 60, line 70, "tee" fitting 72, and line 78.

The second circuit of dash valve 52 is in fluid communication with secondary reservoir 24 via outlet line 64, "tee" fitting 66, and line 80. The output of the second circuit of the dash valve 52 functions to release the rear tractor parking brake circuit. The rear tractor parking brake circuit further includes a line 82, a two-way check valve 84, a line 86, well known quick pressure release valve 88, lines 90, 92, "tee" fittings 94, 96, lines 98, 100, 102 and 104, and rear tractor brake actuators 106, 108, 110, 112. Rear tractor brake actuators 106, 108, 110, 112 are thus caused, by the presence of air pressure, to displace slack adjustors 114, 116, 118 and 120 to release the well known spring-biased parking brakes.

The tractor front service brake circuit includes a line 73 from the foot-actuated treadle service brake assembly 48, a "tee" fitting 75, a line 128, well known quick pressure release valve 130, lines 132, 134, and front tractor brake actuators 136, 138. The front tractor brake actuators 136, 138 are thus caused, by the introduction of metered air pressure, to displace slack adjustors 114, 116, 118 and 120 to apply the well known spring-biased service brakes.

The main tractor rear service brake circuit includes the line 73, the "tee" fitting 75 and the line 77 from the foot-actuated treadle service brake assembly 48 to the pressurized fluid control module 111. The foot actuated treadle service brake assembly meters the system air pressure from the secondary reservoir 24 to the module 111 as an air pressure signal in response to the braking effort indicated by the vehicle operator. The module 111, after conditioning this metered air pressure signal as will be discussed presently, then directs the metered and conditioned air pressure signal through the line 146, the "tee" fitting 148, and the lines 150, 152 to the 2-port relay valves 154, 156. The 2-port relay valve 154, 156 are capable of being placed in fluid communication with system air pressure via primary reservoir 22, the line 54, the "tee" fitting 56, and the lines 158, 168. Based on the air pressure signal delivered by the pressurized fluid control module 111, the 2-port relay valves 154, 156 proportionally meter the system air pressure to the rear tractor service brakes in the well known fashion via lines 164, 166, 168, 170 to the rear tractor brake actuators 106, 108, 110, and 112 so as to apply a modulated braking effort through slack adjustors 114, 116, 118, and 120.

The supplemental tractor rear service brake circuit includes a line 144 from foot-actuated treadle service brake assembly 48 to two-way valve 84 of the tractor rear parking brake circuit. This passage prevents pressurization, via the foot-actuated treadle service brake assembly 48, of the tractor rear parking brake circuit, as is well known in the art.

Overall Description of Module 111

Having described the overall fluid pressure brake system, the reader is directed to FIGS. 2, 3, 4, 5, 6, 7, and 8 wherein the pressurized fluid control module 111 of the present invention may be seen as constructed from a single body section 200. The pressurized fluid control module 111 is provided with three outlet orifices, including: 1) tractor rear service brake control outlet orifice 202; 2) trailer service brake control outlet orifice 204; and 3) trailer parking brake supply outlet orifice 206. Each of these orifices is provided with threaded fittings for the attachment of the lines 146, 170, and 124, respectively.

Figure 2:
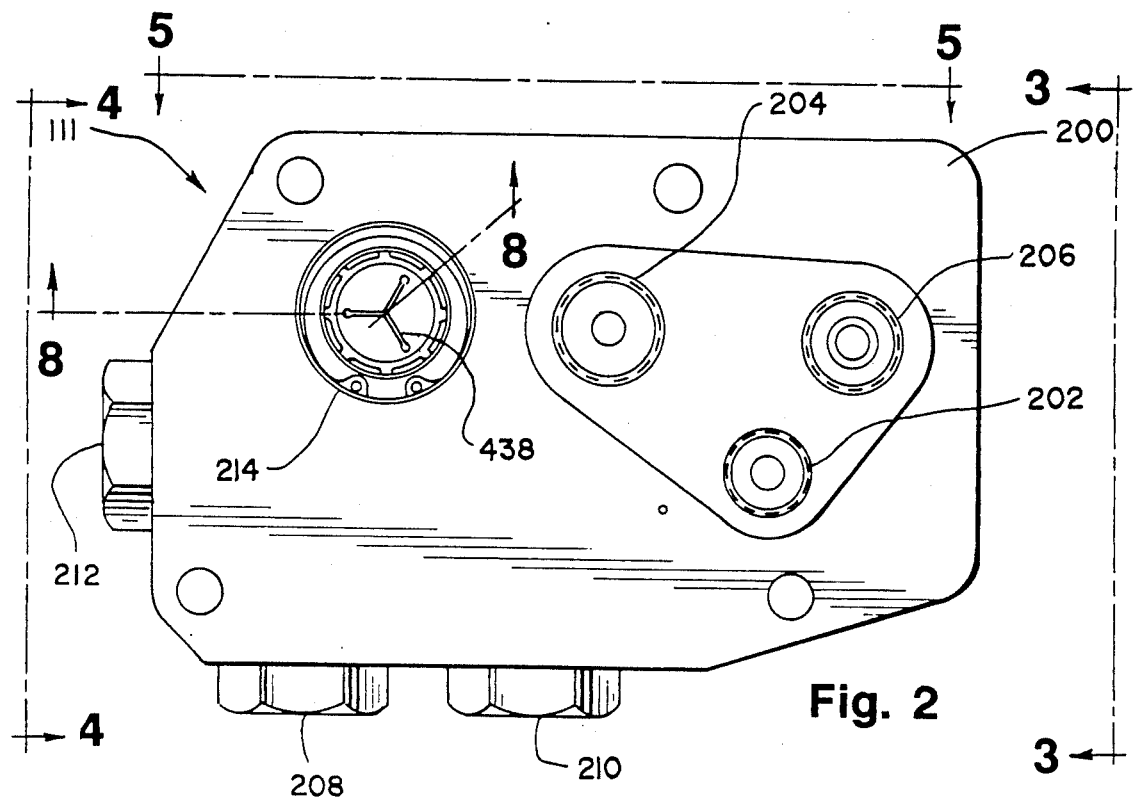
FIG. 2 is an overhead plan view of a particular embodiment of the pressurized fluid control module of the present invention which may be employed in the brake system schematically depicted in FIG. 1.
Figure 5:
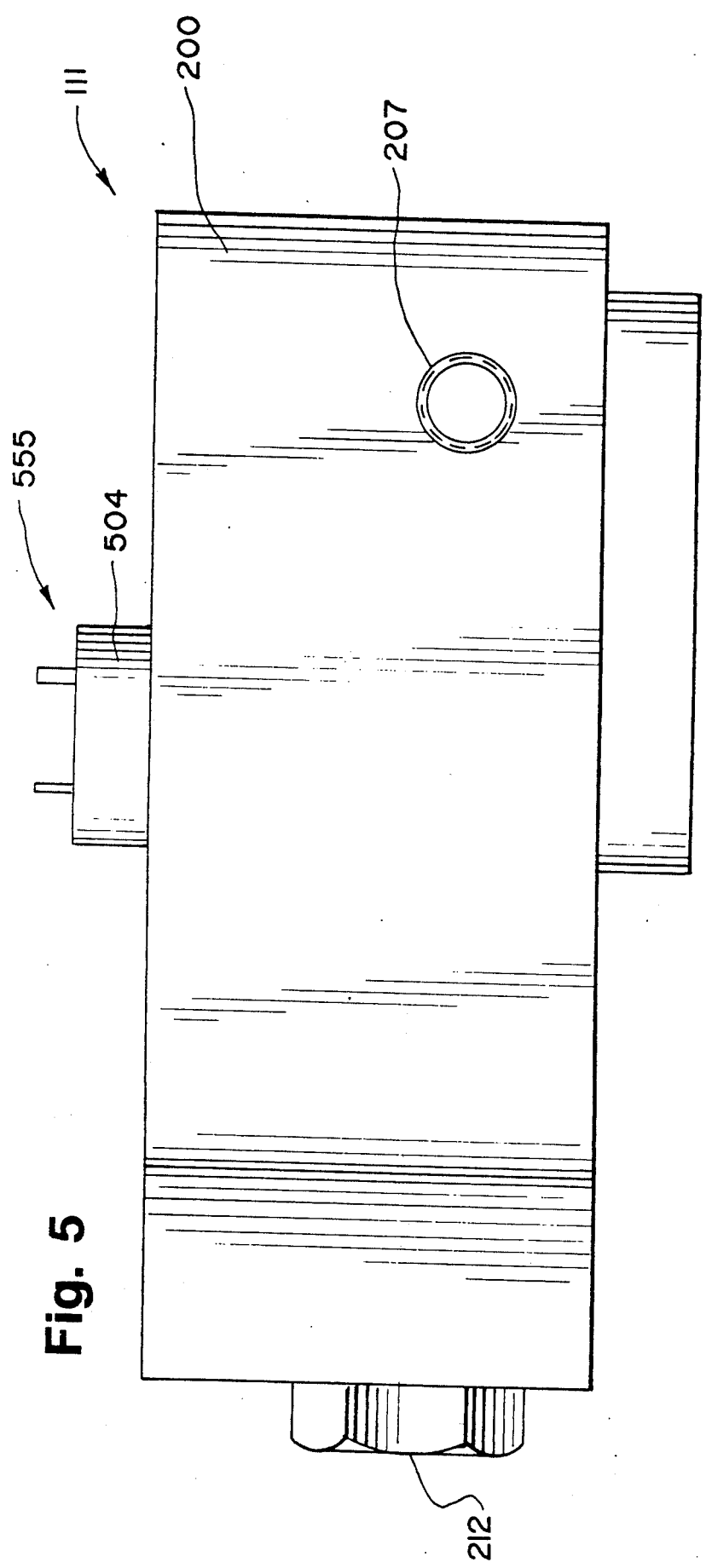
FIG. 5 is an overhead view of the pressurized fluid control module taken along the line 5—5 of FIG. 2 and showing the tractor parking brake supply inlet orifice according to the present invention.
Figure 8:
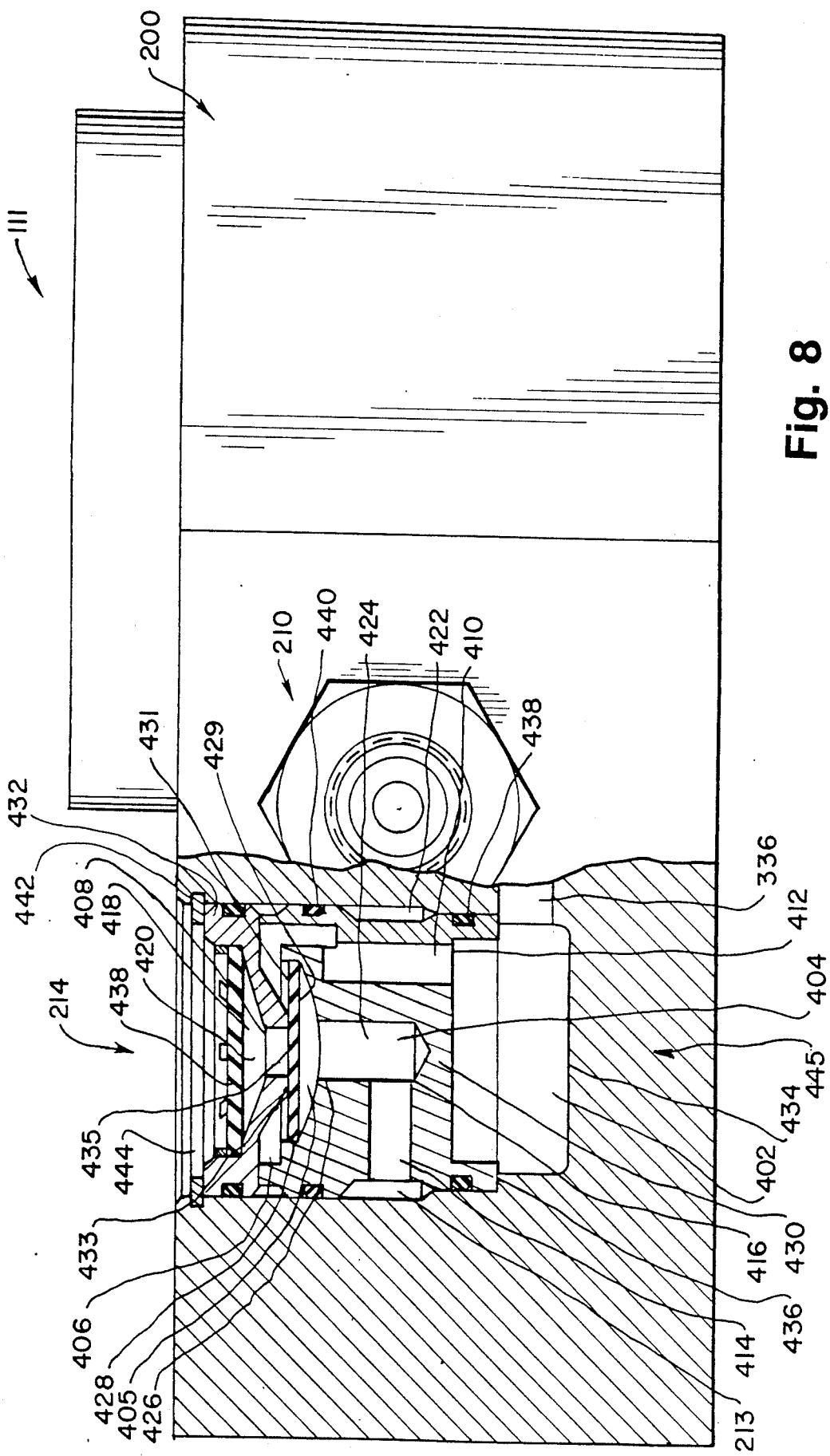
FIG. 8 is a sectional view of the pressurized fluid control module taken along the line 8—8 of FIG. 2 with certain reservoirs and service and parking brake actuators, primarily the quick release orifice assembly, schematically depicted for purposes of illustration.

As can be viewed in the figures, the module 111 is also provided with four fluid pressure inlets, including: 1) tractor parking brake supply inlet orifice 207, best viewed in FIG. 5; 2) foot-actuated treadle service brake assembly first circuit inlet orifice 208; 3) foot-actuated treadle service brake assembly second circuit inlet orifice 210; and 4) hand operated trailer service brake inlet orifice 212. Each of these orifices is also provided with threaded fittings for the attachment of the lines 122, 71, 77 and 76, respectively. The module is further provided with quick release exhaust orifice 214, as best seen in FIGS. 2 and 8.

Figure 3:
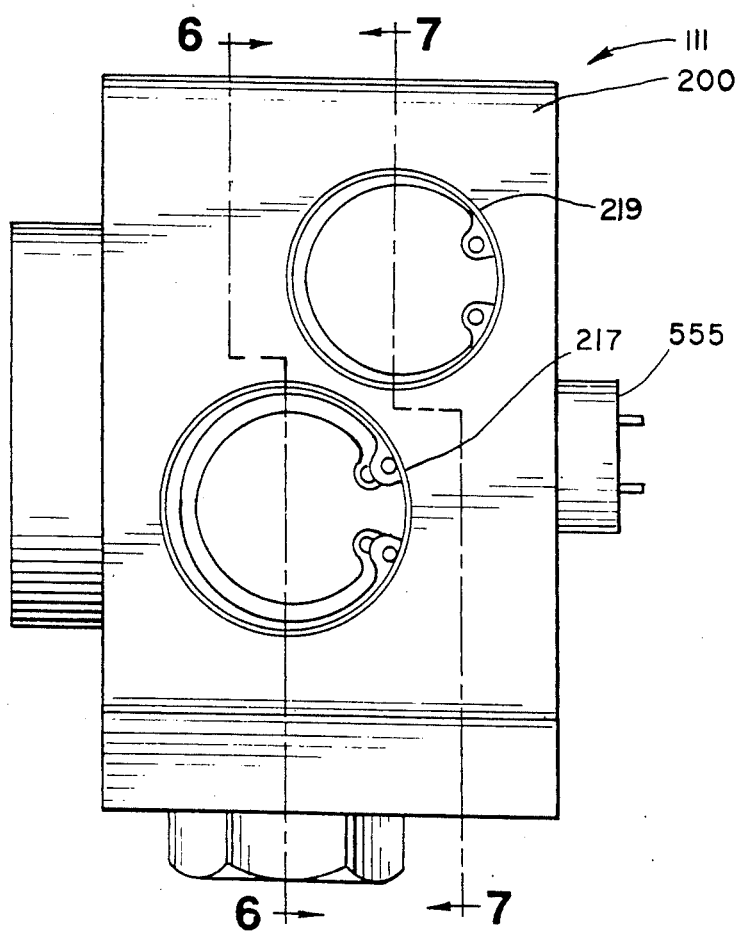
FIG. 3 is a side view of the pressurized fluid control module taken along the line 3—3 of FIG. 2 and showing access orifices allowing the installation of the proportioning apparatus and the installation of the tractor fluid pressure protection according to the present invention.
Figure 4:
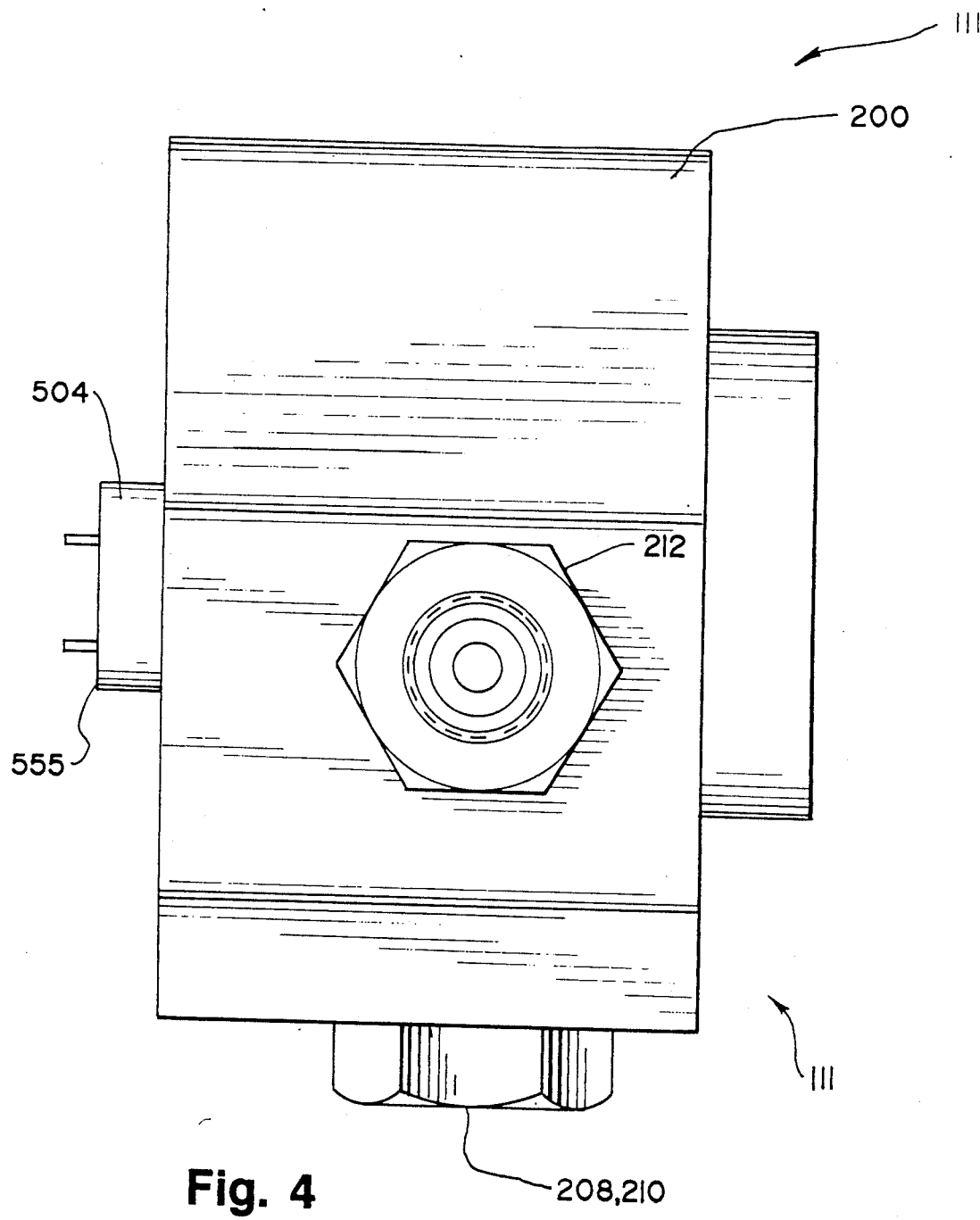
FIG. 4 is a side view of the pressurized fluid control module taken along the line 4—4 of FIG. 2 and showing the hand operated trailer service brake inlet orifice according to the present invention.

Module 111 is further provided with access orifices 217 and 219, which can be advantageously viewed in FIG. 3. Access orifice 217 allows the installation of the proportioning apparatus for modulating the braking effort to the tractor rear service brake circuits, while orifice 219 allows the installation of the tractor fluid pressure protection valve in the event of trailer separation from the tractor.

The internal features and operation of the module 111 will now be explained by reference to the illustrations and a discussion of the function of each of the sections comprising the module 111.

Tractor Proportioning Apparatus

Figure 6:
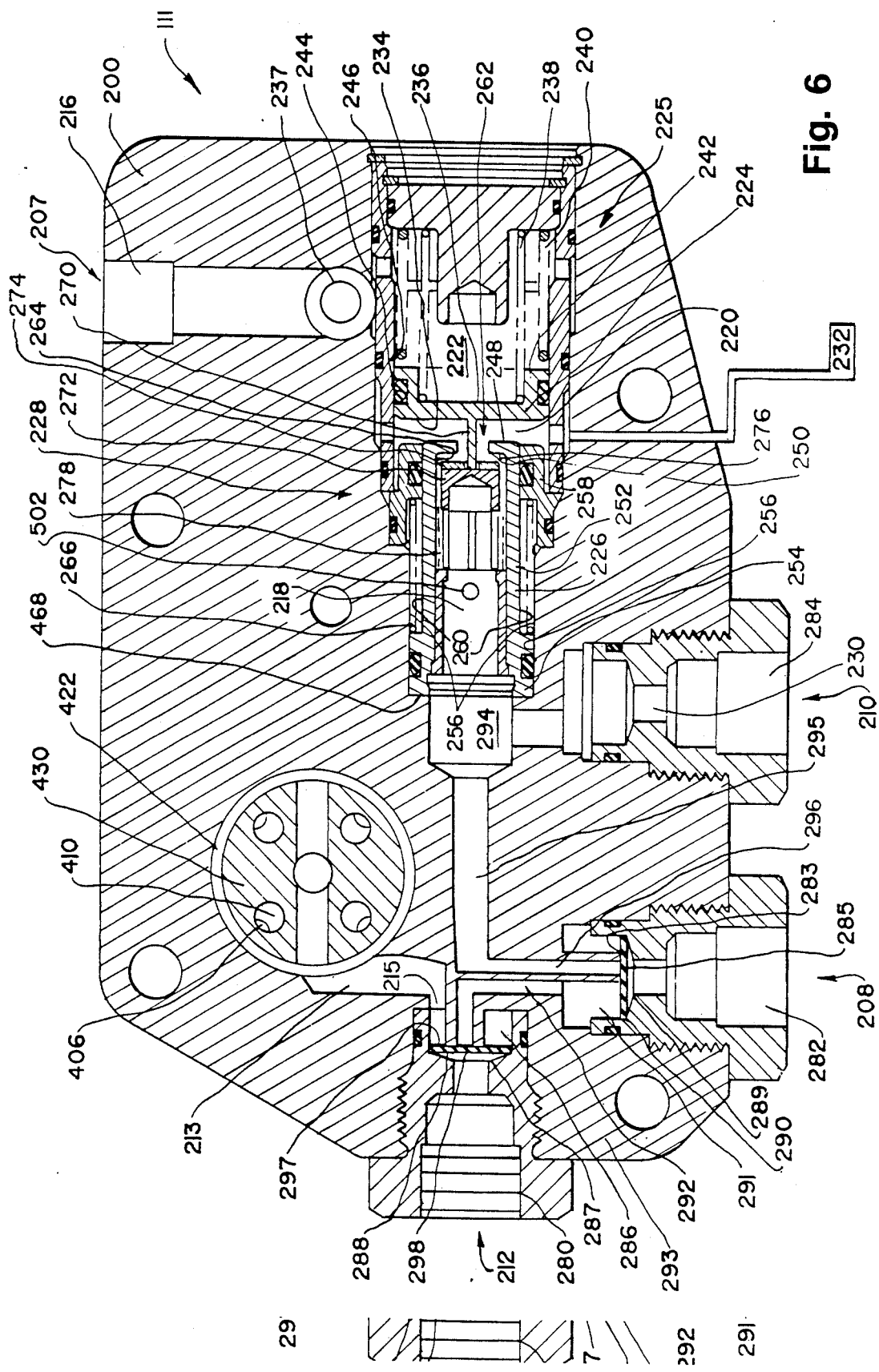
FIG. 6 is a sectional view of the pressurized fluid control module taken along the line 6—6 of FIG. 3 with certain reservoirs and service and parking brake actuators, primarily the proportioning apparatus and internal check valving, schematically depicted for purposes of illustration.

The proportioning apparatus 225 for modulating the braking effort to the tractor rear service brake circuits is integral with the module 111, as best seen in FIG. 6. The proportioning apparatus 225 has a first control chamber 218, a delivery chamber 220 and second control chamber 222. A first piston 224 serves as the boundary between the delivery chamber 220 and the second control chamber 222, while a second piston 226 separates the delivery chamber 220 from the first control chamber 218. A valve generally indicated as 228 can be selectively opened (to allow communication between the chamber 218 and 220) or closed (to prevent such communication), as will be further discussed.

There are two pressure inputs and a single pressure output of the proportioning apparatus 225. The second control pressure input arrives via the foot-actuated treadle service brake assembly first circuit inlet orifice 210 and service brake second circuit inlet passage 230, whereby air pressure enters the first control chamber 218 at the air pressure metered by the foot-actuated treadle service brake assembly second circuit. The second input is a control pressure input via the tractor parking brake supply inlet orifice 207 and a tractor parking brake supply passage 216, whereby pressurized air at system pressure enters the second control chamber 222. The single output is vented from delivery chamber 220, through a delivery passage 232 (shown symbolically in FIG. 6), to the tractor rear service brake control outlet orifice 202.

The piston 224 has a first face 234 forming a wall of delivery chamber 220 and a second face 236 forming a wall of the second control chamber 222. The piston 224 is translatable to the left or right to change the relative size of the delivery chamber 220 and the second control chamber 222. Springs 238 and 240 bias the first piston 224 to the left when the first piston 224 is urged against these springs by air pressure on the face 234. The first piston 224 has a circumferential wall 242 and a seal 244 which slidingly engages a cylinder wall 246. The seal 244 separates the second control chamber 222 and the delivery chamber 220.

The second piston 226 has a first face 248 defining a wall of the delivery chamber 220, a second face 250, and a skirt 252. The skirt 252 includes a piston ring 254 which engages a cylindrical wall 256 defined by the body 200. A second piston ring 258 set in the wall 256 also engages the outer cylindrical wall 260 of the skirt 252. The second piston 226 is translatable to the left or right to change the relative size of the delivery chamber 220 and the first control chamber 218. An aperture 262 formed in the second piston 226 communicates between the first face 248 and the second face 250 when the valve 228 is open. The inner wall 264 of the skirt 252 defines a portion of the first control chamber 218. A spring 266 biases the second piston 226 to the left, up to a stop 268 formed by a portion of the body 200.

The valve generally indicated as 228 comprises a stem 270 extending from the first face 234 of the first piston 224 through the aperture 262 to a valve member 272 which includes an annular seal 274. A spring 278 is provided to bias the valve member 272 constantly against the stem 270, so as to cause the valve member 272 to follow the motion of the first piston 224. The lip 276 of the second face 248 forms the seat of the valve 228. When the seal 274 is seated on the seat 276, due to the first and second pistons 224 and 226 being urged apart, the aperture 262 is closed. Otherwise, the aperture 262 is open and allows communication between the first control chamber 218 and the delivery chamber 220. As will become apparent, the first piston 224, the second piston 226, the spring (or more broadly, the second piston biasing means) 266 and the aperture 262 cooperate together as a proportioning valve which determines the ratio of the delivery pressure to the tractor rear service brake circuit. The delivery pressure is always maintained at a value less than or equal to the pressure provided to the second control chamber 218 as metered through the foot actuated treadle brake assembly 48.

First proportioning valve bypass means are provided for increasing the delivery pressure relative to the first control pressure when a second control pressure exceeds a predetermined value. The first proportioning valve bypass means is defined by the second control chamber 222, the springs 238 and 240, the first piston 224, the valve 228, the cylinder skirt 252, and the stop 268.

Second proportioning valve bypass means are provided for increasing the delivery pressure relative to the metered first control pressure via the foot-actuated treadle service brake assembly 48 when the metered first control pressure via the foot-actuated treadle service brake assembly 48 exceeds a predetermined valve. A second proportioning valve means is defined by the relative sizes of the first face 234 of the first piston 224 and the second face 250 of the second piston 226 (the former is much larger than the latter), and by the different ease of travel to the right allowed the pistons 224 and 226 by their respective spring biasing means.

The proportioning apparatus for modulating the braking effort to the tractor rear service brake circuits functions as follows. When the metered first control pressure via the foot-actuated treadle service brake assembly 48 is nearly zero (gauge pressure), there is no delivery pressure because the first control pressure is less than the pressure loss in the valve. Thus, there is very little force urging the piston 226 to the right, so the biasing force exerted by the spring 266 shifts the second piston 226 fully to the left, and the skirt 252 abuts the stop 268. The valve 228 is open because there is little pressure on the first face 234 of the first piston 224. When the valve 228 is thus open, the pressure in the delivery chamber 220 is equal to that in the first control chamber 218. In short, each piston has traveled as far as it can to the left, and in that configuration the valve 228 is open. The presence or absence of the pressure in the second control chamber 222, which can only urge the first piston 224 to the right, does not affect the ratio of the first control pressure to the delivery pressure.

Figure 11:
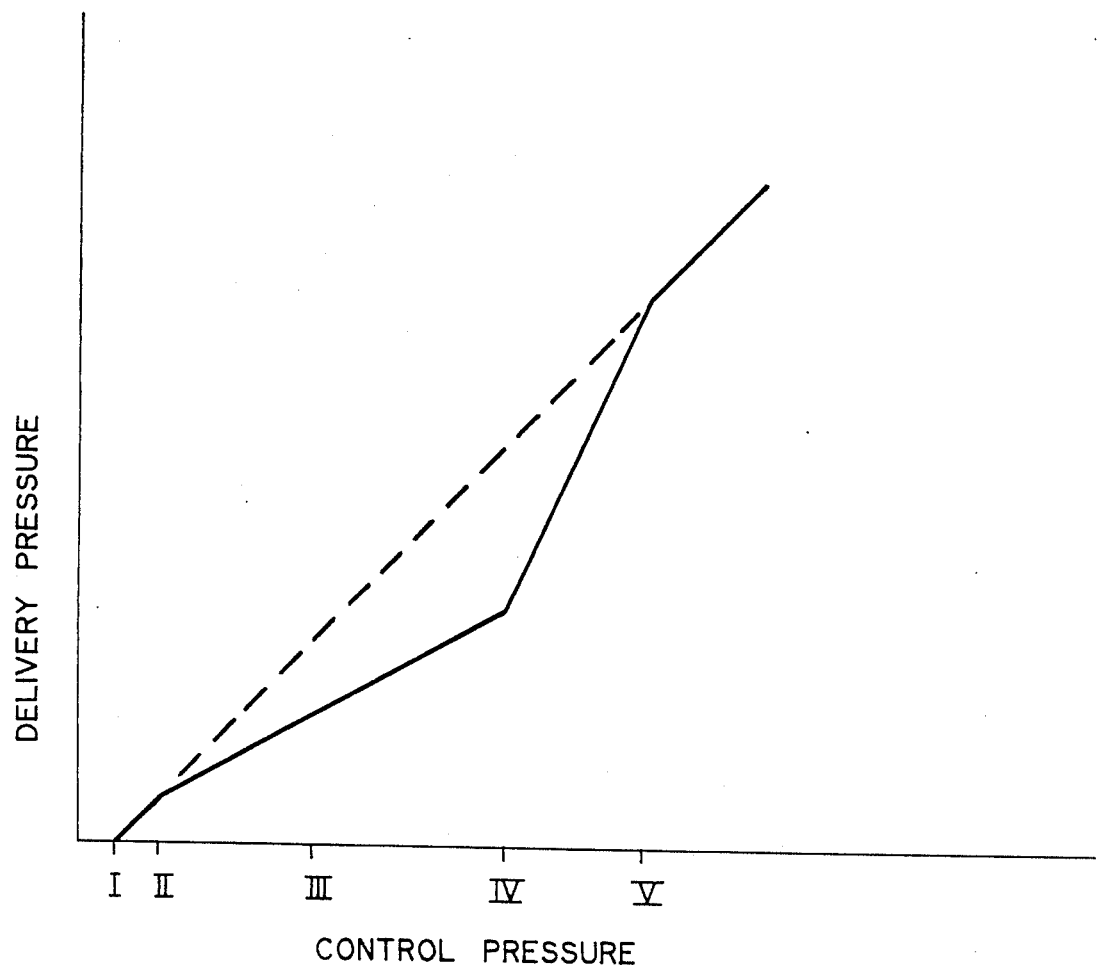
FIG. 11 is a plot which shows the relation of delivery pressure to control pressure of the pressurized fluid control modules of FIGS. 2-10.

When the control pressure is increased sufficiently that the plot shown in FIG. 11 enters Region III (between control pressure values indicated as II and IV), the delivery pressure is lowered, relative to the first control pressure. Thus, the plot of FIG. 11 deviates from the dotted line which indicates a one-to-one ratio of control to delivery pressure. When the control pressure increases to this extent, the control pressure on the face 234 of the first piston 224 urges the piston to the right sufficiently to close the valve 228. Before the valve 228 closes, there is no force tending to urge the second piston 226 to the right because the respective pressures on the faces 248 and 250 of the second piston 226 are equal. After the valve 228 closes, a pressure difference can develop between the chamber 218 and 220.

How the valve 228 causes proportioning is better understood by considering what happens when the first control pressure is increased slightly. Because the valve 228 is closed, a pulse of slightly increased control pressure can act on the second piston 226, urging it to the right slightly. The pressure in the first control chamber 222 is always equal to or greater than the pressure in the delivery chamber 220, so the momentary opening of the valve 228 results in access of the increased pressure in the first control chamber 218 to the delivery chamber 220 and the first face 234 of the first piston 224. The initial perturbation of the piston 220 thus causes the first piston 224 to respond by moving to the right, again closing the valve 228 and allowing a difference in pressure to exist between the delivery chamber 220 and the first control chamber 218. Because the working area of the face 234 of the first piston 224 is much greater than the effective working area of the first face 248 of the second piston 226, and because of the bias forces of the respective springs, the pressure required for the first piston 224 to translate sufficiently to the right to close the valve 228 is only about half as great as the pressure required for the second piston 226 to translate sufficiently to open the valve 228. Thus, when the control pressure is slightly increased, the valve 228 opens only until the pressure in the delivery chamber 220 reaches the intended fraction of the pressure in the first control chamber 218. When that state is reached, the valve 228 is again closed, maintaining the pressure difference. The proportioning valve 228 thus proportions the delivery pressure to the first control pressure when the first control pressure exceeds about 10 psig and the second control chamber is not pressurized.

The first proportioning valve bypass means works as follows. If a second control pressure above a predetermined level is conveyed to the second control chamber 222, this second control pressure is added to the bias of the springs 238 and 240. The first piston 224 will be sufficiently biased to the left that the first piston 224 will be essentially immobile, the valve 228 will be open and the first control pressure and the delivery pressure will be equal. Instead of acting as a low-ratio (e.g., 1:2) proportioning valve between the first control chamber 218 and the delivery chamber 220, above a minimum second control pressure threshold the first control pressure and the delivery pressure will be equal. Thus, the proportioning junction of the proportioning apparatus 225 is substantially bypassed.

Second proportioning valve bypass means can also be provided according to the prevent invention. This second bypass means functions when the pressure in the first control chamber 218 is substantially at its maximum value, as shown by the curve between the control pressure valves indicated as IV and V in FIG. 11. Between the control pressure of IV and V, both pistons have translated sufficiently to the right that the ratio of spring pressure (by the springs 238 and 240) to the surface area of the face 234 is greater than one ratio of the spring pressure (spring 266) to the surface area of the face 250. In this condition a pulse of higher first control pressure tends to open the valve 238 (by translation of the second piston 226) more readily than it tends to close the valve by translation of the first piston 224. Ultimately, as both valves are translated to the extreme right against their spring biases, the valve 228 is open and there is free communication between the first control chamber 218 and delivery chamber 220. If there is sufficient pressure in the second control chamber 222 to cause the first bypass means to operate, the second bypass means will have no further effect, since either bypass means results in the pressure between the first control chamber 218 and the delivery chamber 220 being equalized.

As is apparent from FIG. 6, air pressure existing in passage 216 from the tractor parking brake supply inlet orifice 207 is in communication via passage 237 to the trailer parking brake supply outlet orifice 206. Thus, by vehicle operator actuation of the manifold push/pull dash valve 52 second circuit, the first circuit of dash valve 52 is placed in fluid communication with primary reservoir 22 via outlet line 54, "tee" fitting 56, line 58, "tee" fitting 60, line 70, "tee" fitting 72, and line 78. The pressurized fluid control module 111 transfers the system air pressure from dash valve 52 and a line 122 to trailer parking brake gladhand connector 126 via a line 124. Thus, the output of the dash valve 52 first circuit releases the well known spring-biased trailer parking brakes.

Tractor Fluid Pressure Protection

Figure 7:
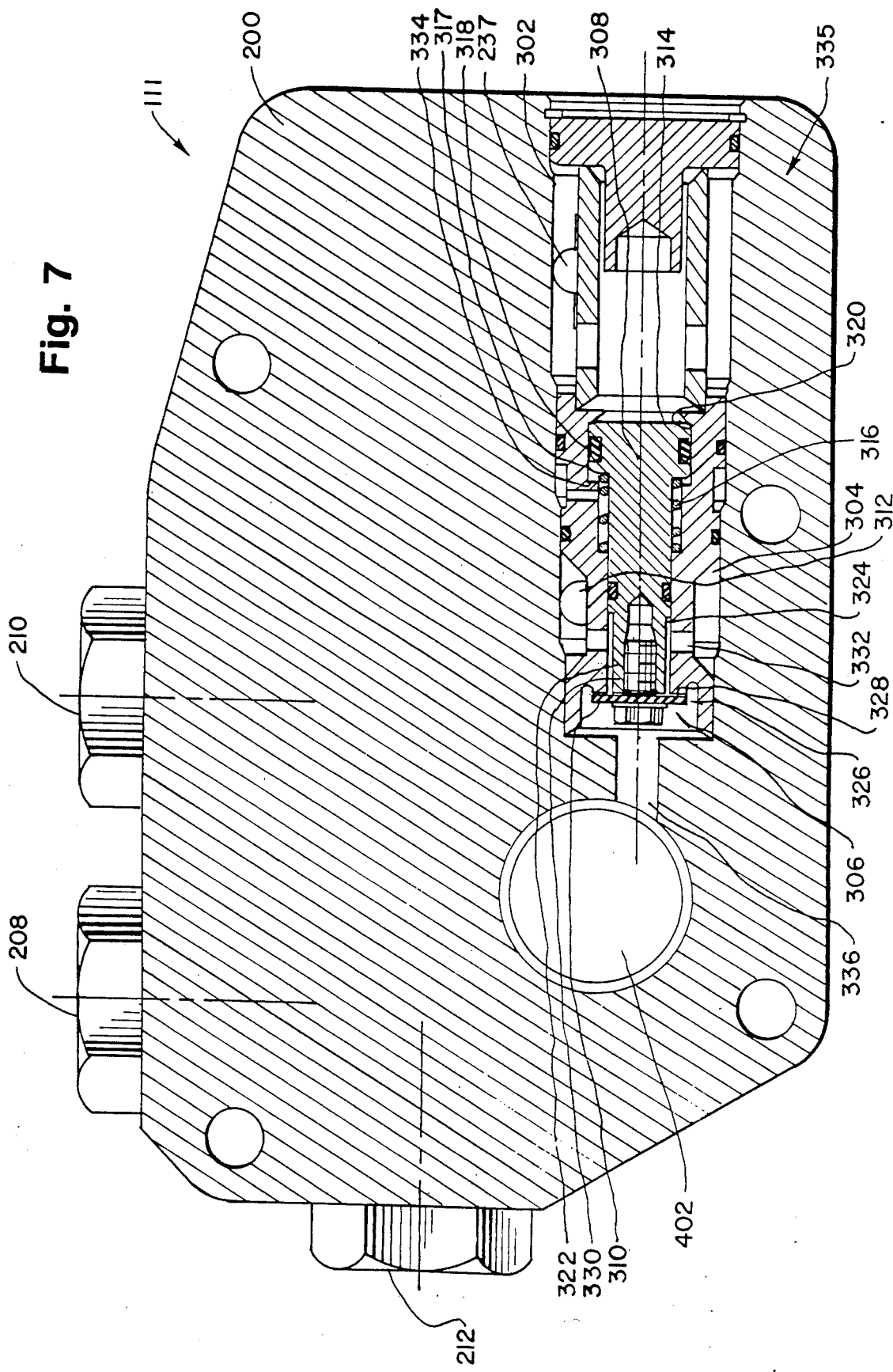
FIG. 7 is a sectional view of the pressurized fluid control module taken along the line 7—7 of FIG. 3 with certain reservoirs and service and parking brake actuators, primarily the tractor protection apparatus, schematically depicted for purposes of illustration.

Tractor fluid pressure protection in the event of trailer separation from the tractor is provided as an integral feature of the module 111, as best seen in FIG. 7. The protection apparatus 335 has a control chamber 302, a delivery chamber 304 and an interior chamber 306. A piston 308 serves as the boundary between the control chamber 302 and the delivery chamber 304. A valve generally shown as 310 is positioned to selectively separate delivery chamber 304 from the interior chamber 306.

Protection apparatus 335 has two pressure inputs and a single pressure output. The first pressure input arrives via the tractor parking brake supply inlet orifice 207, the tractor parking brake supply passage 216 and the passage 237 (shown in FIG. 6), whereby pressurized air at the system pressure of 125 psig letters the control chamber 302. The second pressure input is the service brake pressure existing within the module 111 as indicated by the vehicle operator via the first circuit of the foot-actuated treadle service brake assembly 48 or the hand-actuated trailer service brake valve 50. Thus, the interior chamber 306 is supplied through passage 336 with the metered air pressure existing within the module 111, as will be discussed in a subsequent section of this specification. The single output is ported from the delivery chamber 304, through a delivery port 312 to the trailer service brake control outlet orifice 204.

The piston 308 has a face 314 forming a wall of control chamber 302 and is translatable to the left or right. Stops 334 limit the movement of the piston 308 to the left. Spring 316 biases the piston 308 to the right when the piston 308 is urged against these springs by air pressure on the face 314. The piston 308 has a circumferential wall 316 and a seal 318 which slidingly engages a valve sleeve 320. The seal 318 separates the control chamber 302 and the delivery chamber 304.

The valve generally in indicated as 310 comprises a stem 322 extending from the piston 308 through an aperture 324 in valve sleeve 320 to a valve member 326 which includes an annular seal 328. The lip 330 of the valve sleeve 320 forms the seat of the valve 310. When the seal 328 is seated on the seat 330, due to the piston 302 being urged to the right, the aperture 324 is closed. Otherwise, the aperture 324 is open and allows communication between the interior chamber 306 and the delivery chamber 304 via radial apertures 322 formed in the valve sleeve 320. As will become apparent, the piston 308, the spring (or more broadly, the second piston biasing means) 310 and the aperture 324 cooperate together as a protection valve which provides a fail safe to preserve the pressure integrity of the module 111 and the tractor service and parking brake circuits in the event of loss of pressure integrity within the trailer parking brake circuit.

The protection apparatus 335 for the fail-safe of the module 111 pressure integrity functions as follows. When system air pressure at 125 psig is present in the control chamber 302 via the tractor parking brake supply inlet orifice 207, there is sufficient pressure acting against the face 314 of the piston 308 to displace the piston 308 to the left. In this position, pressurized air is allowed to pass through the valve 310 and the apertures 332 into the delivery chamber 304. Thus, the trailer service brake circuit is established.

When system air pressure is not present in the control chamber 302 via the tractor parking brake supply inlet orifice 207 (e.g., due to emergency detachment of the trailer from the tractor), there is insufficient pressure acting against the face 314 of the piston 308 to urge the piston 308 to the left. The biasing force exerted by the spring 316 urges the piston 308 fully to the right to close the valve 310. Thus, communication between the interior chamber 306 and delivery chamber 304 is immediately and completely terminated and the pressure within the module 111 is retained.

Quick Release Pressure Venting

Shown is FIGS. 6 and 8 is the quick-release pressure orifice assembly, generally indicted as 445, for venting residual fluid pressure from the module 111 and trailer service brake circuit upon termination of vehicle operator braking effort. The orifice assembly 445 has an exhaust chamber 402 and a bypass chamber 404. A two-way check valve diaphragm 406 serves is the boundary between the bypass chamber 404, the two-way flow chamber 405, a first control passage 428, and a second control passage 408.

The orifice assembly 445 is generally comprised of two members, the base member 430 and the cap member 432. The base member is fitted into a recessed cavity 434 in the body 200 of the module 111 and abuts stops 436. The cap member 432 is provided with a seal 438 to separate the bypass chamber 404 and the exhaust chamber 402 and a seal 440 to separate the bypass chamber 404 and the first control passage 406. The cap member 432 is further provided with a lip 433 and an orifice 435. The cap member 432 abuts the upper surface of the base member 430 and is restrained by a retaining 442.

The input to the orifice assembly 445 is provided to the bypass chamber 404 through an outlet passage 213, supply passage 414 and supply orifice 416 from the module service brake passages, which will be discussed further as an aspect of the check valves below. The bypass chamber 404 functionally includes annular chamber 422, passage 414, cavity 424 and orifice 426. This input can be best considered as the trailer service brake air pressure.

The two alternative outputs from the orifice assembly 445 include the first control passage 406 and the second control passage 408. The first control passage 406 is in selective communication with passage 410 and orifice 412, which allows further fluid communication with exhaust chamber 402. As already disclosed, exhaust chamber 402 is in communication with the passage 336 for delivering service air pressure to the trailer service brake circuit via protection apparatus 335 as described above. The second control passage 408 is in selective communication with an outlet chamber 420 via an orifice 418. The outlet chamber 420 is constantly vented to the atmosphere through the flaps of diaphragm 438 (best shown in FIG. 2), which is restrained to the cap member 432 via retaining ring 444. Diaphragm 428 had a first face 429 exposed to the two-way flow chamber 405 and a second face 231 exposed to the first and second outlet passages 406 and 408.

The orifice assembly generally indicated as 445 can be selectively opened (to allow communication between the bypass chamber 404 and the first control passage 406 or to allow communication between the first control passage 406 and the second control passage 408) or closed (to prevent such communication), as will be further discussed.

The function of the orifice assembly 445 is to assist in releasing the trailer service brake circuit pressure. The control pressure input during the braking process arrives via the passage 213 and flows into the bypass chamber 404, through orifice 426 and into the two way flow chamber 405. As the pressure acting on the first face 429 of the diaphragm 428 from the two-way flow chamber 405 is greater than the atmospheric pressure acting on the second face 431 of the diaphragm 428 from the outlet chamber 420 and the first control chamber 406, the diaphragm 428 is sealingly pressed against the orifice 435 and flow through the second output 408 is terminated. The diaphragm 428, further exposed to the pressure of the two-way flow chamber 405, is made of a resilient material, such as rubber, and is allowed to deform about the outer circumference so as to allow air pressure to vent from the two-way flow chamber 405 to the first outlet passage 406.

After the input maximum metered fluid pressure is reached in the two-way flow chamber 405, the diaphragm 428 returns to the position shown in FIG. 8. If the input pressure is reduced (e.g., the vehicle operator ceases actuation of the foot-actuated service brake assembly 48 or the hand-controlled trailer service brake valve 52), the pressure in the flow chamber 406, the bypass chamber 404, as the passage 414 and the passage 213 is vented via the foot-actuated service brake treadle assembly 48, as will be discussed below.

As the pressure then on the face 431 of diaphragm 428 is higher than the pressure existing in the flow chamber 405 and on the face 432 of the diagram 428, the diaphragm 428 is caused to conform to the lower portion of the flow chamber 405. The orifice 435 is then opened and air pressure is vented from the exhaust chamber 402 through the orifice 412, the passage 410, the first control passage 406, the bypass chamber 405, and the orifice 435 to the second control passage 408. The air pressure is then vented to atmosphere via orifice 418, outlet chamber 420 and diaphragm 438. Thus, the trailer service brake circuit can be conveniently and quickly vented of residual pressure.

Integrated Check Valves

Tractor fluid pressure protection in the event of trailer separation from the tractor is enhanced by the presence of internal check valves as an integral feature of the module 111, as best seen in FIG. 6. The module 111, in addition to the inlets and outlets noted above, has a trailer service brake pressure passage 280 communicating with the hand-operated trailer service brake inlet orifice 212, a foot-actuated service brake pressure passage 282 which provides further communication with the foot-actuated treadle assembly first circuit inlet orifice 208 and a foot-actuated service brake pressure passage 284 allowing communication to the brake assembly second circuit inlet orifice 210.

The foot-actuated service brake pressure passage 282, in communication with assembly first circuit inlet orifice 208, is also in communication with a first valve chamber 291 via orifice 289 and two-way check valve diaphragm 290. The diaphragm 290 has a first face 283 and a second face 285. A passage 290 is in communication with the first valve chamber 291 and is in selective communication, via two-way diaphragm 288, with a third valve chamber 286.

The foot-actuated service brake pressure passage 284 allowing communication to the brake assembly second circuit inlet orifice 210 is in selective communication with second valve chamber 291. Fluid pressure entering brake assembly second circuit inlet orifice 210 passes through passage 284, service brake second circuit inlet passage 230, common pressure chamber 294, passage 295, passage 296, and two-way check valve diaphragm 290 to the first valve chamber 291. The common pressure chamber 294, as may be seen, provides communication of the metered first control pressure to the first control chamber 218 for use in the proportioning apparatus 225 as described above.

The trailer service brake pressure passage 280, in communication with the hand-operated trailer service brake inlet orifice 212, is further in communication with the third valve chamber 286 via orifice 287 and two-way check valve diaphragm 288. Diaphragm 288 is also provided with a first face 297 and second face 298. The third valve chamber 286 is in subsequent communication with the outlet passage 213 via orifice 215, which provides service brake pressure to the bypass chamber 404, the exhaust chamber 402 and the passage 336 for delivering service air pressure to the trailer service brake circuit via protection apparatus 335 as described above As the trailer service brake circuit is preferentially actuated first, the foot-actuated treadle brake assembly 48 is caused to actuate the foot-service actuated treadle service brake assembly first circuit. Thus, air pressure is initially metered into the first circuit inlet orifice 208. The pressure in chamber 282 is increased and causes the pressure on the second face 285 of diaphragm 290 to exceed the pressure on the first face 283. Thus, the deformable diaphragm 290 allows air to pass about its outer circumference into the first valve chamber 291 and through the passage 292. As the pressure on the first face 297 of the diaphragm 288 is higher than that on the second face 298, the diaphragm 288 is displaced to the left, allowing air pressure to enter the third valve chamber 286 for subsequent communication to the passage 213.

As the foot-actuated treadle service brake assembly 48 is further depressed, the second circuit is opened and metered air is allowed into the second inlet orifice 210. The air pressure is thus allowed through the inlet chamber 284, the passage 230, the common pressure chamber 294, the passage 295 and the passage 296. The air pressure thus is exerted against the first face 283 of diaphragm 290 so to urge the diaphragm downward. Thus, as the second circuit metered air pressure is higher than the first, additional air pressure flows to the trailer service brake circuit in the manner noted above. The tractor front brake circuit is also pressurized at this time. This sequence is preferentially reversed upon the termination of braking effort.

Alternately, the vehicle operator can cause only the trailer service brakes to engage by operation of the hand-operated trailer service brake valve 50. By so doing, air pressure is delivered to the hand-operated trailer service brake inlet 212. This pressure, by acting against the second face 298 of the diaphragm 288, causes the diaphragm 288 to deform about its outer circumference and air pressure enters the third valve chamber 286 for subsequent communication to the trailer service brake circuit via passage 213.

Upon the release of the treadle service brake assembly 48 or the trailer service brake valve 50, the air pressure in chambers 286, 291, 294, and 284 is relieved through the assembly 48 or valve 50 via well known quick release means. Any residual pressure in the lines communicating with the inlet orifices 212 or 208 escapes via diaphragms 288 and 290, respectively, through the first inlet orifice 210 circuit.

Importantly, if the pressure integrity of either the first circuit, the second circuit, or the hand operated trailer service brake circuit is compromised, the diaphragms 288 and 290 will immediately seal the offending circuit.

For example, if pressure is lost to inlet 212, the diaphragm 288 will be caused, by virtue of the higher pressure on the first face 297 than the atmospheric pressure on the second face 298, to displace completely to the left and seal orifice 287. Similarly, if pressure is lost to input 208, the pressure differential between faces 283 and 285 of diaphragm 290 will cause orifice 289 to become sealed. Likewise, if pressure is lost to inlet 210, the reverse pressure differential on diaphragm 290 will seal off passage 296.

Stop Lamp Switching Control

The stop lamp switching control 555 is shown in FIG. 2. The typical pressure sensitive switch 504, of well known construction, is preferably responsive to an input pressure of 5 psig. As seen in FIG. 6, orifice 502 is provided from the chamber 218 to switch 504. Thus, pressurization of the chamber 218 causes the activation of the tractor-trailer combination rear stop lamp units.

By combining the stop lamp switching control 555 to the module 111, a convenient and reliable pressure signal is available regardless of the service brake circuit selected by the vehicle operator.

Optional Relay Valving

Figure 9:
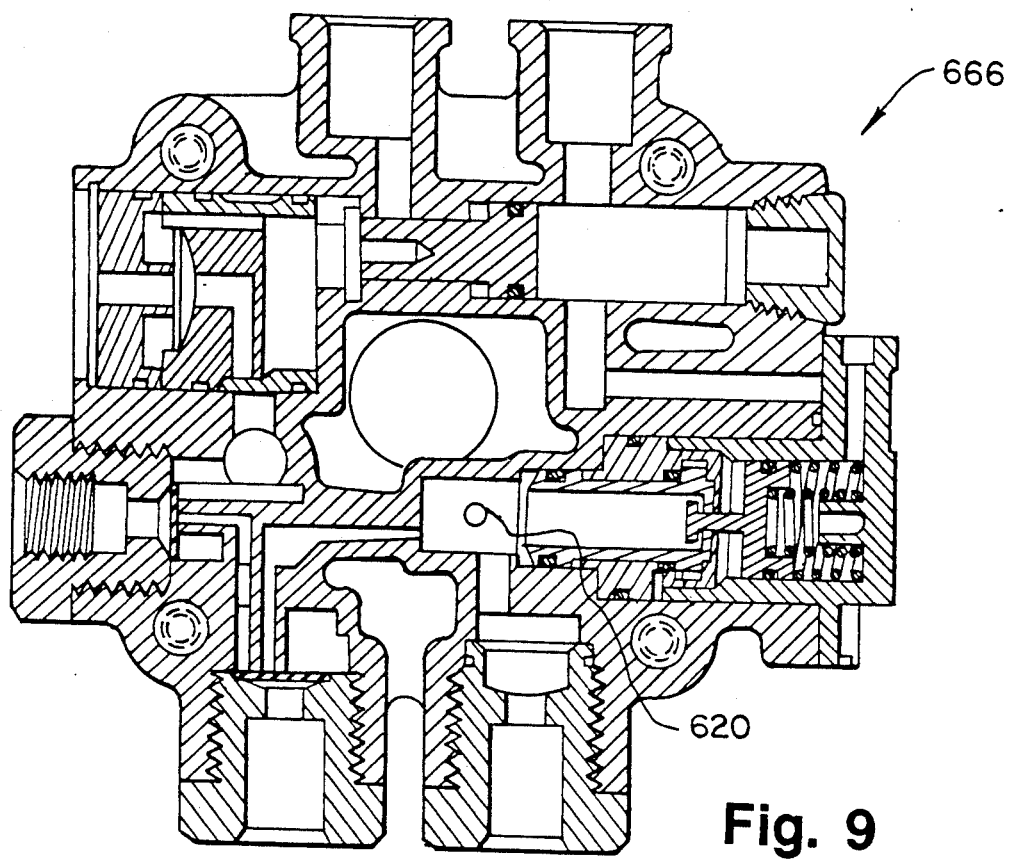
FIG. 9 is an overhead plan view of an alternative embodiment of the pressurized fluid control module of the present invention which may be employed in the brake system schematically depicted in FIG. 1.
Figure 10:
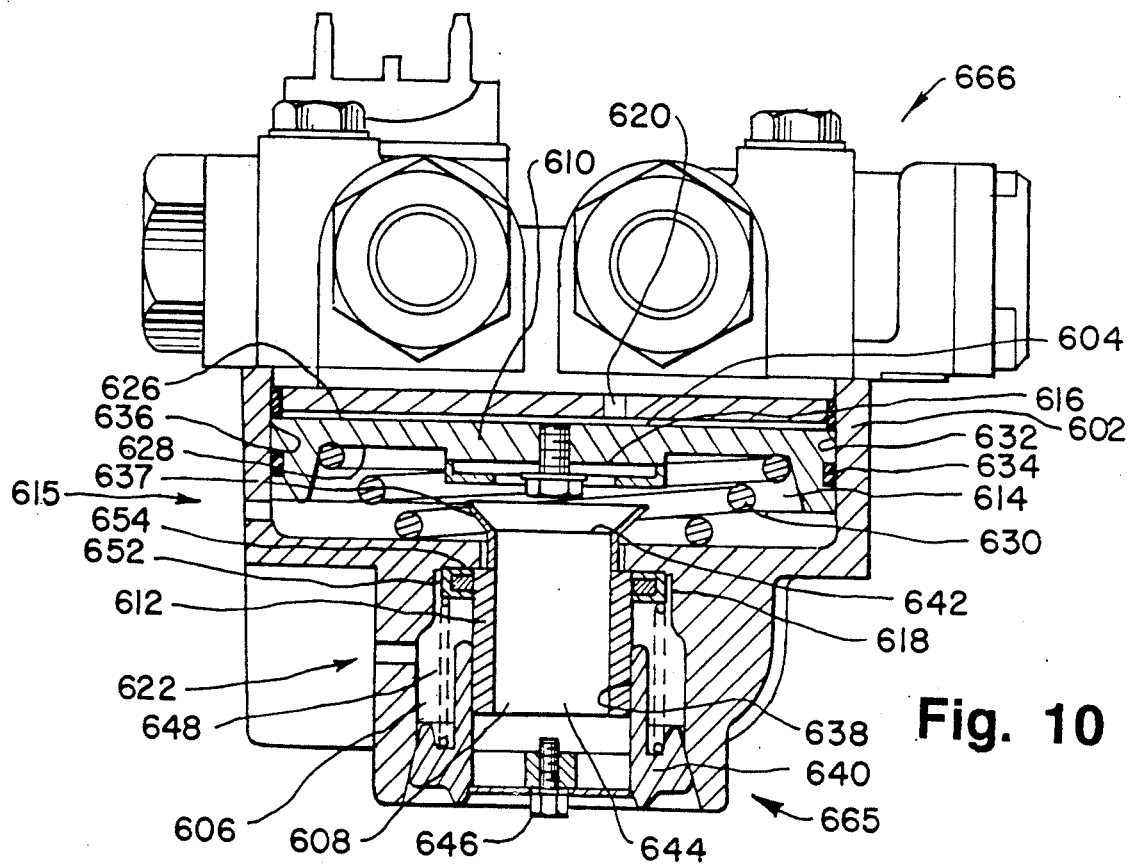
FIG. 10 is a sectional view of the pressurized fluid control module of FIG. 9 with certain reservoirs and service and parking brake actuators schematically depicted for purposes of illustration.

As shown in FIGS. 9 and 10, optional fluid pressure relay valve assembly 665 for providing control of the tractor or tractor-trailer combination service brake circuits may be seen integrally combined with an alternative pressurized fluid control module embodiment 666. As the various apparatus for the module 666 remain the same as described for the previous embodiment, detailed reference characters have been omitted from the drawings to aid understanding of the relay valve assembly 665. It should, however, be clear that those skilled in the art will nevertheless be able to deduce the function and orientation of the various features of the module 666.

The fluid pressure relay valve assembly 665 generally is an incorporation of the two 2-port relay valves 154 and 156 shown in FIG. 1 into the module 666. As the pressure loss over the relatively short distances separating the module 666 and the tractor rear service brake actuators 106, 108, 110 and 112 is low, this incorporation retains the functionality of the rear tractor service brake circuits and saves substantially in component costs, space and complexity while improving the reliability of the system.

The fluid pressure relay valve assembly 665 includes a housing 602 for transferring the braking effort to the tractor rear service brake circuits integrally within the module 666, as best seen in FIG. 10. The relay assembly 665 has a first control chamber 604, a second control chamber 606, a delivery chamber 614, and an exhaust chamber 608. The first control chamber 604 is generally at the first control chamber 218 pressure of the proportioning apparatus 225 as discussed above via orifice 620. The second control chamber 606 is constantly provided with system air pressure at 125 psig from the primary reservoir 22 via orifice 609. The delivery chamber 614 is at a controlled air pressure and provides air pressure directly to brake actuators 106, 108, 110 and 112 via outlet orifice 615. A first piston 610 serves as the boundary between the first control chamber 604 and the delivery chamber 614, while a second piston 612 separates the delivery chamber 614 from the second control chamber 606. A valve generally indicated as 616 can be selectively opened (to allow communication between the chambers 614 and 608) or closed (to prevent such communication). A valve generally indicated as 618 can be selectively opened (to allow communication between the chamber 606 and 614) or closed (to prevent such communication), as will be further discussed.

There are two pressure inputs and a single pressure output of the relay valve assembly 665. The first control pressure input enters the first control chamber 604 from the first control chamber 218 of the proportioning apparatus 225 via the orifice 620 as a pressure signal of the service brake first circuit metered pressure to the rear tractor brake circuit. The second input is the control pressure input to second control chamber 606 from the vehicle system air pressure reservoir 22 at 125 psig via the orifice 622. The single controlled output is vented from delivery chamber 622 through orifice 615 to the tractor rear service brake circuits as shown in FIG. 1.

The first piston 610 has a first face 626 forming a wall of the first control chamber 604 and a second face 628 of equal surface area forming a wall of the second control chamber 614. The piston 610 is translatable up or down to change the relative sizes of the first control chamber 604 and the delivery chamber 614. Spring 630 biases the first piston 610 upward when the first piston 610 is urged against the spring 630 by air pressure on the face 626. The first piston 610 has a circumferential wall 632 and a seal 634 which slidingly engages a cylinder wall 636 in relay valve assembly housing 602. The seal 634 separates the first control chamber 604 and the delivery chamber 614.

The second piston 612 is generally a hollow cylinder that is slidingly mounted within the cylinder 638 provided in insert 640, which is fixedly attached to the housing 602. The upper opening 642 of the second piston 612 opens selectively into the delivery chamber 614, while the lower opening 644 of the second piston 612 opens to an exhaust 646 of well known construction. The second piston 612 has a sealing lip 637 extending into delivery chamber 614 and positioned to be selectively sealed by valve 616. Around the outer circumference of the second piston 612 is the valve 618. A spring 648 is located to urge the second piston 612 upward so as to close the valve 618. The valve 618, separating the delivery chamber 614 and the second control chamber 606, forms one wall of the second control chamber 606. The valve 618 is formed from an annular lip 652 that sealingly engages valve seat 454 on housing 602. The second control chamber 606, at system air pressure of 125 psi, is an annular cavity formed between the inner wall 650 of housing 602 and the outer wall of the second piston 612.

In operation, the proportioning apparatus 225 of the module 666 vents a metered and conditioned air pressure signal through orifice 620 from first control chamber 218 to first control chamber 604. As the pressure in the first control chamber 604 rises, the first piston 610 is urged downward against the bias of spring 630. At a pressure of about 30 psig in the first chamber 604, the first piston 610 will have been displaced sufficiently for valve 616 to close by the mating of a valve seat 652 of the valve 616 engaging the sealing lip 636 of the second piston 612.

By this engagement, delivery chamber 614 is sealed off from the upper opening 642 of the second piston 612 and is no longer in communication with the exhaust chamber 608. Thus, pressure is now capable of being developed within the delivery chamber 614.

Additional pressure to the first control chamber 604 will cause the first piston 610 to move further downward. As this occurs, the valve 618 is caused to open due to the following movement of the second piston 612 downward. System pressure air, at 125 psig, is then allowed to vent from the second control chamber 606, through the open valve 618 and into the delivery chamber 614. This flow will continue, however, only until the pressures of the first control chamber 604 and the delivery chamber 614 are equal. This is due to the equal surface areas of the first and second faces 626 and 628 of the first piston 610. As the pressure in the first control chamber 604 is further increased, the pressure in the delivery chamber 614 is thus also equally increased, up to a maximum of 125 psig. Thus, air pressure can be metered to the rear tractor service brake circuit.

When the pressure in the first control chamber 218 is relieved by the exhaustion of air pressure through the foot-actuated treadle service brake assembly 48 as the vehicle operator ceases braking effort, the pressure in the first control chamber 604 is also relieved and the first piston 610 returns to its upward position by the urging of spring 630. Valve 618 then closes and valve 616 opens, exhausting air pressure in the delivery chamber 614 to the atmosphere via opening 642, exhaust chamber 608 and exhaust assembly 646. Thus, the rear tractor service brakes are released.

The preferred embodiments of the present invention have been described, however, it is not intended to limit the spirit and scope of the invention. It will be understood that various changes in the details, arrangements and configuration of the parts which have been described and illustrated above in order to explain the nature of the present invention may be made by those skilled in the art within the principle and scope of the present invention as expressed in the appended claims.

What is claimed is:

1. A tractor-trailer brake actuation and release circuit comprising:

a pressurized fluid, a pressure source, at least one fluid pressure reservoir, service brake means, parking brake means, a foot-actuated treadle assembly service brake valve, a hand-actuated trailer service brake valve, a manifold push/pull valve and a pressurized fluid control module, said pressurized fluid control module comprising pressure inlet means for receiving said pressurized fluid, a plurality of interconnected pressure chambers, proportioning means to vary the fluid pressure to at least a portion of said service brake means depending on the presence of said trailer, protection means to prevent the loss of pressurized fluid within said brake actuation and release circuit upon separation of said trailer from said tractor, porting means to release residual fluid pressure in said pressurized fluid control module, and pressure actuated valve means for selectively preventing fluid transportation between two or more of said interconnected chambers, switching means to energize the vehicle rear stop lamps upon the presence of fluid pressure in at least one of said interconnected pressure chambers, and a plurality of pressure outlet means;

said pressurized fluid control module being a single, integrated, multifunctional unit for selectively communicating said pressurized fluid to at least a portion of said service brake means or a portion of said parking brake means depending on the presence of said trailer, the position of said foot-actuated treadle assembly service brake valve, the position of said hand-actuated trailer service brake valve, and the position of said manifold push/pull valve.

2. The invention of claim 1, wherein said foot-actuated service brake assembly and said manifold push/pull valve are supplied with said pressurized fluid from said reservoir.

3. The invention of claim 2, wherein
said tractor-trailer brake actuation and release circuit is provided with a plurality of fluid circuits, including a trailer service brake circuit, a rear tractor service brake circuit, a front tractor service brake circuit, a trailer parking brake circuit and a rear tractor parking brake circuit,
said foot-actuated treadle service brake assembly is provided with a plurality of fluid circuits, including a first fluid circuit and a second fluid circuit, and
said manifold push/pull valve is provided with a plurality of fluid circuits, including a first fluid circuit and a second fluid circuit; whereby
said trailer service brake circuit is actuated by said foot-actuated service brake assembly first fluid circuit or said hand-actuated trailer service brake valve,
said trailer service brake circuit, said rear tractor service brake circuit and said front tractor service brake circuit are sequentially actuated by said foot-actuated service brake assembly second fluid circuit,
said trailer parking brake circuit is actuated by said manifold push/pull valve first circuit, and
said rear tractor parking brake circuit is actuated by said manifold push/pull valve second circuit.

4. The invention of claim 3, wherein a portion of said trailer service brake circuit, a portion of said rear tractor service brake circuit, and a portion of said trailer parking brake circuit define said pressure inlet means for receiving said pressurized fluid of said pressurized fluid control module.

5. The invention of claim 4, wherein said portion of said trailer service brake circuit is in selective fluid communication with said protection means to prevent the loss of pressurized fluid within said brake actuation and release circuit, said porting means to release residual fluid pressure in said pressurized fluid control module, and said pressure actuated valve means for selectively preventing fluid transportation between two or more of said interconnected chambers of said pressurized fluid control module.

6. The invention of claim 4, wherein said portion of said rear tractor service brake circuit is in selective fluid communication with said proportioning means to vary the fluid pressure to said rear tractor service brake circuit and said pressure actuated valve means for selectively preventing fluid transportation between two or more of said interconnected chambers of said pressurized fluid control module.

7. The invention of claim 4, wherein said portion of said trailer parking brake circuit actuated by said manifold push/pull valve first circuit is in selective fluid communication with said protection means to prevent the loss of pressurized fluid within said brake actuation and release circuit of said pressurized fluid control module.

8. The invention of claim 4 wherein said plurality of pressure outlet means is in direct communication with at least a portion of said rear trailer service braking circuit.

9. A tractor-trailer pneumatic brake actuation and release circuit comprising:
a pressure source, at least one fluid pressure reservoir, service brake means, parking brake means, a foot-actuated treadle assembly service brake valve, a hand-actuated trailer service brake valve, a manifold push-pull valve and said pressurized fluid control module,
said pressurized fluid control module comprising pressure inlet means for receiving said pressurized fluid, a plurality of interconnected pressure chambers, proportioning means to vary the fluid pressure to at least a portion of said service brake means depending on the presence of said trailer, protection means to prevent the loss of pressurized fluid within said pneumatic brake actuation and release circuit upon separation of said trailer from said tractor, porting means to release residual fluid pressure in said pressurized fluid control module, switching means to energize in at least one of said interconnected pressure chambers, pressure actuated valve means for selectively preventing fluid transportation between two or more of said interconnected chambers, and a plurality of pressure outlet means in direct communication with at least a portion of said service braking means;
said pressurized fluid control module being a single, integrated, multifunctional unit for selectively communicating said pressurized fluid to at least a portion of said service brake means or a portion of said parking brake means depending on the presence of said trailer, the position of said foot-actuated treadle assembly service brake valve, the position of said hand-actuated trailer service brake valve, and the position of said manifold push/pull valve.

* * * * *

UNITED STATES PATENT AND TRADEMARK OFFICE
CERTIFICATE OF CORRECTION

PATENT NO. : 5,046,786                      Page 1 of 3

DATED : September 10, 1991

INVENTOR(S) : Jeffery S. Johnston; Michael G. Smith and Mark Karpinski

It is certified that error appears in the above-identified patent and that said Letters Patent is hereby corrected as shown below:

```
In the ABSTRACT - Line 8 "the rear" should read
--the tractor rear--.

Column 2, Line 29, delete "a".

Column 3, Line 23, "an overhead plan" should read --a
front plan--;
Line 56, "an overhead plan" should read  --a front
sectional plan--.

Column 4, Line 17, delete the second "the";
Line 41, "which further directs" should read -- further
direct--.

Column 5, Line 31, "a line" should read -- the line--;
Lines 59 and 60, "114, 116, 118, and 120" should read --
140,142--;
Line 65, "foot actuated"  should read --foot-actuated--.

Column 6, line 9, "and the line 158,168." should read
--the line 158, the "tee" fitting 160, and the
lines 168,169.--.

Column 7, line 11 "The second" should read --The
first--;
Line 16 "at" should read --as--;
Line 26, "The piston" should read --the first piston--;
Lines 59 and 60, "lip 276 of the second face 248 forms
the seat" should read --second face 250 of the second
piston 226 forms the seat 276--.
```

UNITED STATES PATENT AND TRADEMARK OFFICE
CERTIFICATE OF CORRECTION

PATENT NO. : 5,046,786

DATED : September 10, 1991

INVENTOR(S) : Jeffery S. Johnston; Michael G. Smith and Mark Karpinski

It is certified that error appears in the above-identified patent and that said Letters Patent is hereby corrected as shown below:

Column 8, Line 6, "foot actuated" should read --foot-actuated--;
Line 45, "to the right" should read --to the left--;

Column 9, Line 6, "220" should read --226--;
Line 42, "junction" should read --function--;
Line 53, "one ratio" should read --the ratio--;
Line 56, "valve 238" should read --valve 228--.

Column 10, Line 33, "letters" should read --enters--;
Line 51, "wall 316" should read --wall 317--;
Line 54, delete "in";
Line 63, apertures 322" should read --apertures 332--;
Line 66, "310" should read --316--.

Column 11, Line 33, "406" should read --428--;
Line 35, "428" should read --406--;
Line 39, "member" should read --member 430--;
Line 41, "cap member 432" should read --base member 430--;
Line 47, "retaining 442." should read --retaining ring 442.--.

Column 12, Line 39, "chamber 406," should read --chamber 405 and--;
Line 40, "chamber 404," should read --chamber 404 is reduced,--
Line 45 "432" should read --429--.

Column 13, Line 8, "290" should read --292--;
Line 40, "treadle brake" should read --treadle service brake--.

UNITED STATES PATENT AND TRADEMARK OFFICE
CERTIFICATE OF CORRECTION

PATENT NO. : 5,046,786  
DATED : September 10, 1991  
INVENTOR(S) : Jeffery S. Johnson; Michael G. Smith and Mark Karpinski It is certified that error appears in the above-identified patent and that said Letters Patent is hereby corrected as shown below:

Column 14, Line 20, "hand operated" should read --hand-operated--;  
Line 36, "FIG. 2." should read --FIGS. 3,4 and 5.--.

Column 15, Line 14 "609" should read --622--;  
Line 38, "622" should read --614--.

Column 16, Line 14, "652" should read --628--;  
line 15, "636" should read --637--.

In the Claims:

Column 17, Line 9 (Claim 1), delete the word "and".

Column 18, Line 47, (Claim 9) "energize in" should read --energize the vehicle rear stop lamps upon the presence of fluid pressure in--.

Signed and Sealed this

Seventh Day of September, 1993

*Attest:*

BRUCE LEHMAN

*Attesting Officer*  Commissioner of Patents and Trademarks